June 14, 1960
A. R. NORDEN
2,941,058
AUTOMATIC CIRCUIT BREAKERS
Filed Feb. 5, 1957
6 Sheets-Sheet 1

INVENTOR.
Alexander R. Norden
BY
Paul S. Martin
ATTORNEY

June 14, 1960

A. R. NORDEN 2,941,058

AUTOMATIC CIRCUIT BREAKERS

Filed Feb. 5, 1957

6 Sheets-Sheet 2

INVENTOR.
Alexander R. Norden

BY

Paul S Martin

ATTORNEY

June 14, 1960

A. R. NORDEN 2,941,058

AUTOMATIC CIRCUIT BREAKERS

Filed Feb. 5, 1957

6 Sheets-Sheet 3

INVENTOR.
*Alexander R. Norden*
BY
*Paul S. Martin*
ATTORNEY

June 14, 1960

A. R. NORDEN 2,941,058

AUTOMATIC CIRCUIT BREAKERS

Filed Feb. 5, 1957

6 Sheets-Sheet 4

INVENTOR.
Alexander R. Norden

BY Paul S. Martin

ATTORNEY

June 14, 1960

A. R. NORDEN 2,941,058

AUTOMATIC CIRCUIT BREAKERS

Filed Feb. 5, 1957

6 Sheets-Sheet 5

INVENTOR.
Alexander R. Norden

BY Paul S. Martin

ATTORNEY

INVENTOR.
Alexander R. Norden
BY
Paul S. Martin
ATTORNEY

United States Patent Office 2,941,058

Patented June 14, 1960

2,941,058

AUTOMATIC CIRCUIT BREAKERS

Alexander R. Norden, New York, N.Y., assignor to Federal Pacific Electric Company, a corporation of Delaware Filed Feb. 5, 1957, Ser. No. 638,262

15 Claims. (Cl. 200—116)

The present invention relates to electrical circuit breakers. This application is a continuation-in-part of my application Ser. No. 397,673, filed December 11, 1953, now Patent No. 2,811,606, entitled Automatic Circuit Breakers.

In one aspect the present invention resides in the provision of a novel enclosure for the circuit breaker mechanism and, in particular, in an enclosure that utilizes a pair of opposed walls of insulation that provide bearing support for the enclosed mechanism, together with a top mounting plate that completes the enclosure.

In another aspect the present invention is concerned with improvements in operating mechanisms of circuit breakers.

Most small circuit breakers rely on spring means for opening of the contacts and for applying resilient contact pressure. Such spring means is also usually relied upon to impose spring bias of a latched element against a current-responsive latch. A feature of the present invention relates to means for effecting the separation of latch pressure from the other factors so that each can be achieved independently according to the respective optimum requirements. In achieving this object of the invention, a circuit breaker mechanism is provided with a separate spring, in addition to the contact-opening and contacting bias means, which separately provides latch pressure.

The sensitivity of a circuit breaker is affected to a considerable degree by the pressure of the latched element against the latching current-responsive device. A certain amount of force is required for the current-responsive element to shift out of the path of the latched element, largely for overcoming latch friction. For example, where the current-responsive element is a bimetal that is deflected laterally by heating caused by the current flowing through the circuit breaker, that bimetal would deflect to one extent (in response to a given current level) if it were free and to a lesser extent where deflection is resisted by latch pressure. Accordingly a further object of the present invention resides in the provision of a novel circuit breaker mechanism having means for establishing latch pressure in a consistent and reliable manner as a factor distinct and separate from other connections and operations. Because of this separate provision it becomes feasible to attain more uniform latching pressure and therefore more uniform response to a particular current level for which a series of circuit breakers are being calibrated than is otherwise feasible. Furthermore, it is also feasible to reliably establish a light latch pressure and therefore attain high sensitivity of circuit breakers, i.e., circuit breakers having low tripping current ratings.

In a well-known particular type of circuit breaker mechanism a current-responsive bimetal (or other current-responsive latch) is carried by a pivoted contact member which also carries a pivoted element that is latched by the current-responsive element. Under normal conditions, a manual operating linkage is effective to drive the moving contact against a companion contact, at such time acting against the bias of a contact-opening spring. When this circuit breaker has been tripped automatically by a current overload, the latched element is spring-driven to pass by the current responsive latch, and relatching is then required. A feature of the present invention accordingly resides in an arrangement for relieving the spring bias of the latched element during relatching, for facilitating re-setting of the circuit breaker.

An additional feature of the invention relates to the type of circuit breaker wherein an actuator or latched element and a current-responsive latch are both carried by a movable contact member, and wherein the latched element moves along the current-responsive latch upon release. An aspect of the invention resides in the pivotal mounting of the latch in an arrangement where current responsive means provides drive for the latch in the tripping direction but wherein the latch can readily be deflected in the tripping direction during resetting of the latched element, thereby to facilitate resetting of the circuit breaker.

Additional objects and features of novelty will be apparent from the following detailed disclosure of two illustrative embodiments of the invention, which are shown in the accompanying drawings forming part of this disclosure.

Figure 3:
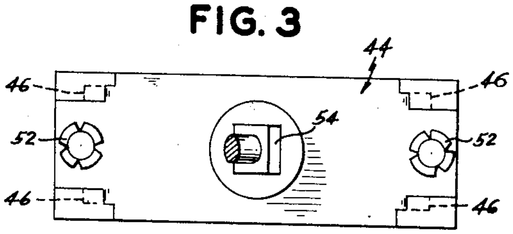
Fig. 3 is a top plan view of the breaker with the operating handle broken away.
Figure 2:
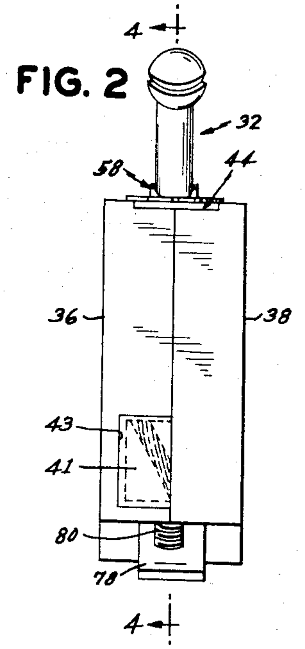
Fig. 2 is an end view of the breaker taken in the direction of the arrow 2 in Fig. 1.
Figure 1:
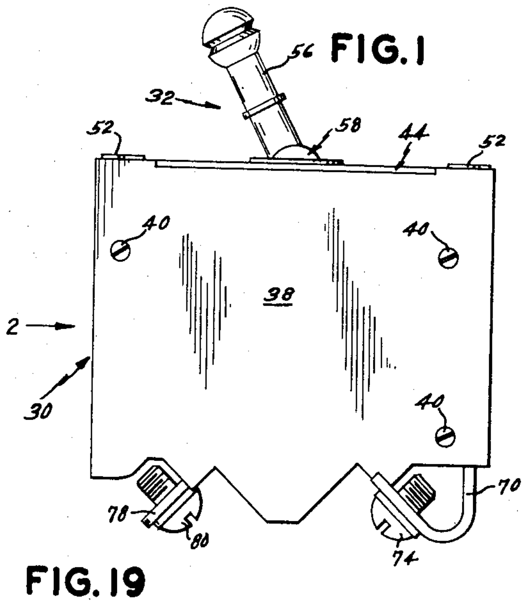
Fig. 1 is a side elevation of a circuit breaker pursuant to the present invention and provided wtih a toggle type handle.
Figure 19:
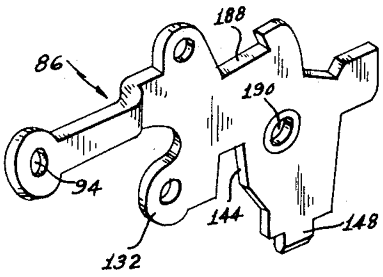
Fig. 19 is a perspective view of the movable switch or contact member of the circuit breaker.
Figure 5:
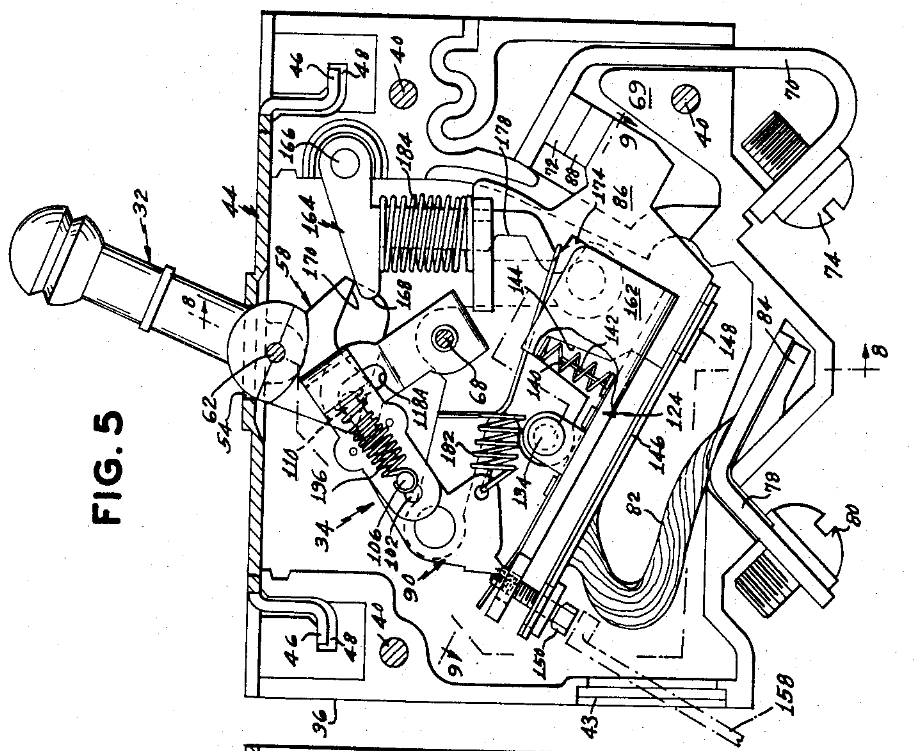
Fig. 5 is a view similar to Fig. 4, with the circuit breaker mechanism illustrated in the closed or circuit making condition thereof, and a calibrating tool being illustrated in phantom.
Figure 4:
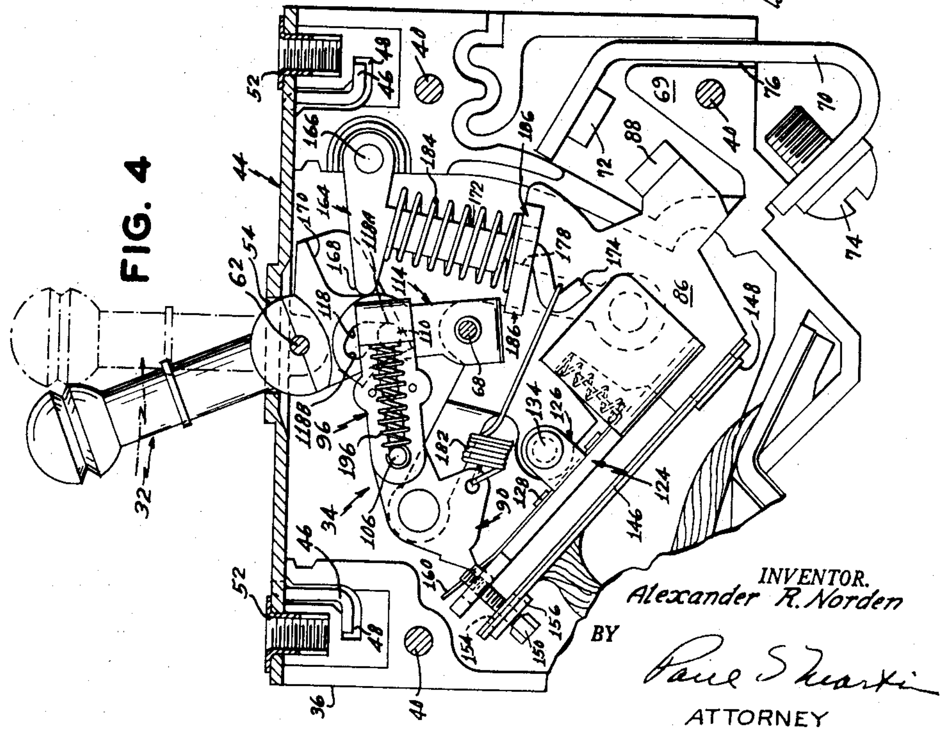
Fig. 4 is a sectional view, on an enlarged scale, taken on the line 4—4 in Fig. 2, the circuit breaker mechanism being illustrated in the open or off condition thereof.
Figures 6, 7, 8, 9, 13, 14:
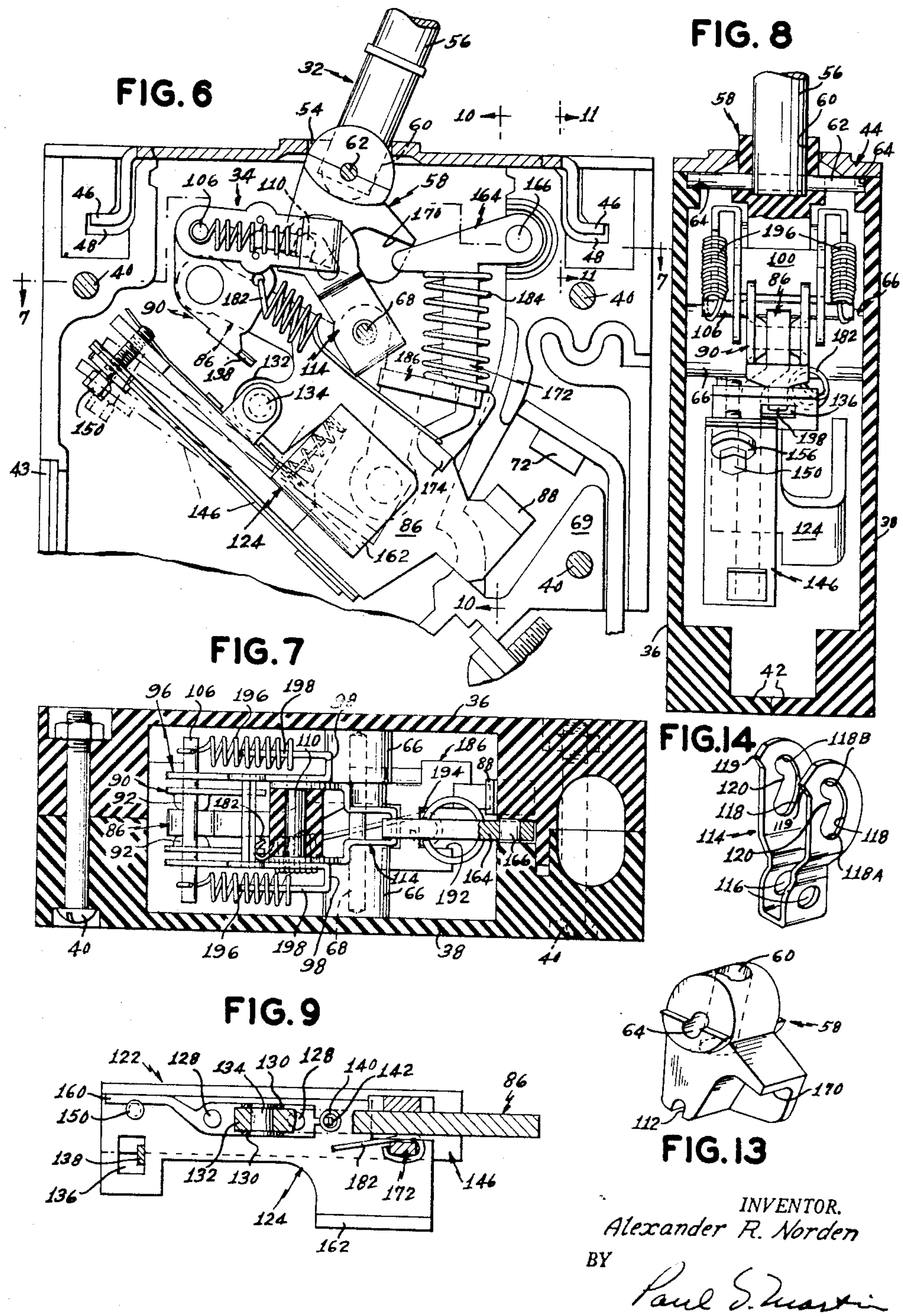
Fig. 6 is a view similar to Figs. 4 and 5 and illustrates the circuit breaker mechanism in the tripped condition thereof, with the handle being held in the circuit making disposition thereof.
Fig. 7 is a sectional view taken on the line 7—7 in Fig. 6.
Fig. 8 is a sectional view taken on the line 8—8 in Fig. 5.
Fig. 9 is a sectional view taken on the line 9—9 in Fig. 5.
Fig. 13 is a perspective view of the handle body of the circuit breaker.
Fig. 14 is a perspective view of a link between the toggle handle and the pivot of the circuit breaker mechanism.
Figures 10, 11, 12, 15, 16, 17, 18, 21:
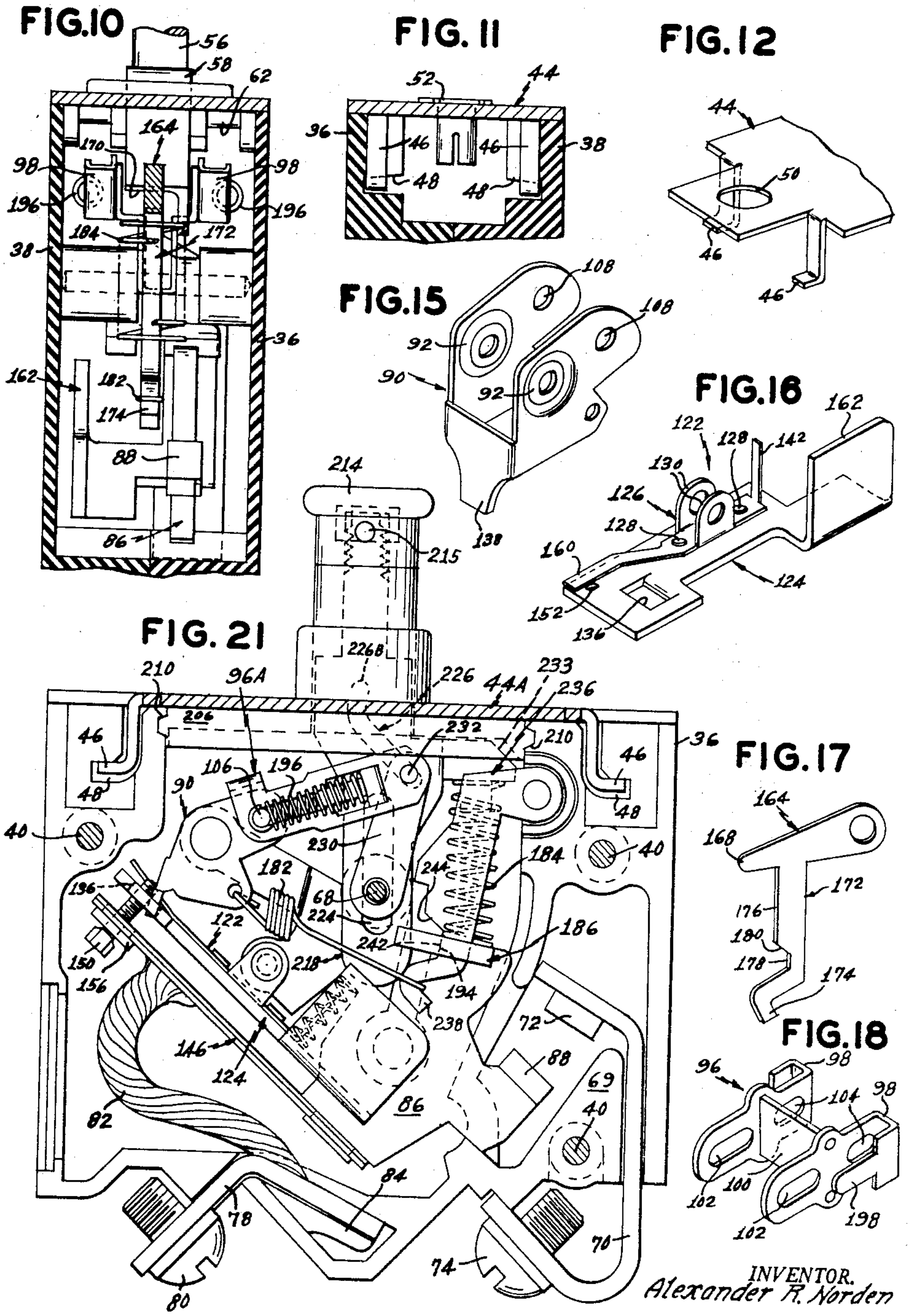
Fig. 10 is a sectional view taken on the line 10—10 of Fig. 6.
Fig. 11 is a sectional view taken on the line 11—11 of Fig. 6.
Fig. 12 is a fragmentary perspective view of the mounting plate of the circuit breaker.
Fig. 15 is a perspective view of the actuator of the circuit breaker mechanism.
Fig. 16 is a perspective view of a balancer and holder assembly of the circuit breaker.
Fig. 17 is a perspective view of the "anti-tease" lever.
Fig. 18 is a perspective view of a link assembly between the actuator and the toggle handle of the circuit breaker.
Fig. 21 is a sectional view on a larger scale taken on the line 21—21 of Fig. 20 and illustrates the circuit breaker in the off or circuit interrupting condition thereof.
Figure 20:
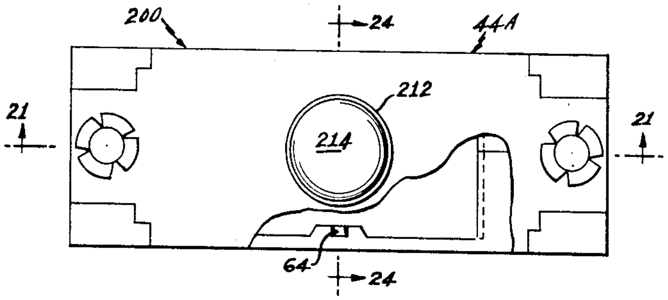
Fig. 20 is a top plan view of the push-pull type circuit breaker pursuant to the present invention.
Figure 27:
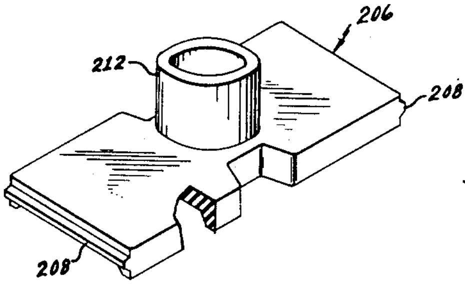
Fig. 27 is a perspective view of a casing insert for the push button.
Figure 28:
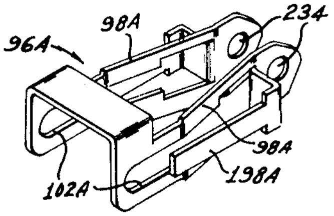
Fig. 28 is a perspective view of a link between the actuator and slide of the push-pull type circuit breaker.
Figure 29:
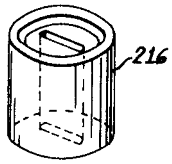
Fig. 29 is a perspective view of a part of the push button assembly.

Referring now to Figs. 1–19 in detail, there is illustrated an automatic circuit breaker 30 pursuant to the present invention, of the type which is provided with a manually operable member or handle 32 of the pivoted or toggle type. The circuit breaker mechanism, which is generally indicated by the reference numeral 34 in Figs. 4–6, is contained within the companion complementary casing parts 36 and 38 which are preferably molded of insulation material and which are retained in housing defining relation, as by the bolts 40. At one end thereof, the casing member 36 is provided with a removable closure 41, the function of which is hereinafter described in detail. Referring now to Fig. 8, it will be noted that at the bottom thereof, the circuit breaker housing is closed by the abutting wall portions 42—42, of the casing parts 36 and 38, respectively. At the opposite end thereof, the circuit breaker housing is closed by a preferably metallic mounting member 44. The mounting member 44 interfits between the companion casing parts 36 and 38, being provided at each end thereof with the laterally spaced hooks 46—46, as best illustrated in Fig. 12, which engage in complementary recessed portions 48 defined in the companion casing parts 36 and 38, as best illustrated in Figs. 4, 5, 6 and 11. It will be noted that each casing part is engaged by a pair of the legs 46 spaced longitudinally of the mounting member 44, at the same side thereof. The mounting member 44, at each end thereof, is provided with an aperture 50 in which there is secured an internally threaded insert 52 whereby the circuit breaker may be mounted on a control panel. The mounting member 44 is also apertured centrally thereof, as a 54, for accommodating the finger piece 56 of the handle assembly 32.

The handle assembly 32, in addition to the finger piece 56, is provided with a handle body 58, best illustrated in Fig. 13, which is preferably molded of suitable insulation material. As here shown, the body 58 has a bore 60 defined therein for receiving the handle piece 56, as illustrated in Fig. 8. In order to accommodate a pivot 62 for the handle assembly, the body 58 is provided with a bore 64 which extends transversely of the bore 60 so that the pivot 62 may pass through the body 58 as well as the finger piece 56. Bearing recesses for the pivot 62 are defined in the casing parts 36 and 48, as at 64, and said pivot is securely retained in said bearings by the mounting member 44. In addition to said bearings the casing parts are also provided with the aligned bearing portions 66—66 for the main pivot 68, the function of which is hereinafter described in detail. In addition, the casing parts are provided with the thickened wall portions 69 (Figs. 4–6) which mount the terminal member 70. Said terminal member is provided with the stationary contact 72, which is disposed thereby within the casing parts, and with a wire securing screw 74, it being noted that the casing parts are provided with an opening 76 in the wall portions 42 thereof for the terminal member 70. The casing parts also mount the terminal member 78 which is provided with a wire securing screw 80 externally of the circuit breaker housing and which is provided interiorly thereof with one end of a flexible connector 82, as at 84, the function of which is hereinafter described in detail.

As here shown, the operating mechanism 34 of the circuit breaker, includes a movable switch or contact member 86 (Fig. 19) which is provided at one end thereof, with a movable contact 88 for engagement with the stationary contact 72. Said contact member is mounted on the previously mentioned pivot 68 for pivotal movement between the casing parts 36 and 38, in a plane parallel thereto. At the end thereof opposite the contact 88, the movable member 86 pivotally mounts an actuator 90 (Fig. 15) of the type claimed in Patent No. 2,647,186, dated July 28, 1953, to T. M. Cole and assigned to the assignee hereof. More specifically, and as best illustrated in Fig. 7, the actuator 90 straddles the movable member 86 and is provided with the confronting pressed-in portions 92—92 which extend into and form a pivot in opening 94 in the movable switch member 86. In order to effect operation of the actuator 90 for manual opening and closing of the circuit breaker, provision is made for a link 96 (Fig. 18). As here shown, the link 96 is constituted by the laterally spaced link elements 98—98 rigidly secured together in said laterally spaced relation by the bar 100 therebetween. Each link element 98 is provided with an enclosed slot 102 and with a pivot opening 104. It will be noted from Fig. 7 that the link assembly 96 straddles the actuator 90 and has a lost motion connection with said actuator by means of the pivot pin 106 which is engaged in the openings 108—108 defined in the actuator 90 and in the slots 102 of the link elements 98. At its other end, the link assembly 96 is connected to the handle 32 through the provision of a pivot pin 110, as best seen in Fig. 7, which is disposed in the groove 112 (Fig. 13) defined in the handy body 58 opposite the bore 60 thereof. Said pin extends from the opposite sides of the handle body and engages in the slots 104 defined in the link elements 98.

The handle 32 and the link assembly 96 constitute a toggle device for manually operating the actuator to open and close the breaker, as in the previously identified patent. Fig. 4 indicates the disposition of the toggle in the open condition of the circuit breaker and Fig. 5 indicates the disposition thereof in the closed condition of the circuit breaker. It will be noted that in said latter condition of the circuit breaker, the toggle is underset, the pivot pin 110 which constitutes the intermediate pivot axis of the toggle being to the right of a line extending between the outer axes of the toggle constituted by the pivot pins 106 and 62 respectively, in both the circuit interrupting and circuit making condition of the circuit breaker mechanism. Consequently, in order to prevent the collapse of the toggle in the circuit closed condition of the circuit breaker and the consequent opening thereof, provision is made for a U-shaped link 114, as best illustrated in Fig. 14. The link 114 is mounted on the main pivot 68 for the movable contact member 86, the aligned apertures 116—116 being provided for this purpose, and as best illustrated in Fig. 7, the link 114 is mounted at one side of said movable contact member. Said link 114 is also provided at each side thereof with a slot 118 and has the portions 120 which project into the slots 118. The handle operated pivot pin 110 extends through the slots 118, and the link 144 is straddled by the link assembly 96. In the open or circuit interrupting condition of the circuit breaker mechanism, the pivot pin 110 is disposed in the lower portion 118A of the slots 118, as in Fig. 4. However, in the circuit making condition of the circuit breakers, said pivot pin is seated in the upper portions 118B (Fig. 14) of said slots, as in Fig. 5, and is retained in position therein by the link portions 120. Link 114, in turn, is maintained in position by having the portion 100, of link 96 (Fig. 18), press against the pointed portions 119 (Fig. 14) of link 114. Said portions 120 constitute locking means for the pivot pin 110 to lock the latter in the slot portions 118B and, consequently, to prevent the collapse of the handle toggle in the closed condition of the circuit breaker so as to retain the circuit breaker in said closed condition thereof. It will be readily apparent that the pin 110 is carried from the lower end 118A of the slots to the upper end 118B of the slots by movement of the handle from the position thereof illustrated in Fig. 4 to the position thereof illustrated in Fig. 5.

Provision is made for a balancer assembly 122, as best illustrated in Fig. 16, which is constituted by a balancer member 124 and a holder 126 therefor which is secured thereto in a suitable manner, as at 128. In order to pivotally mount the balancer member 124 on the movable switch member 86, the holder 126 is provided with the projecting laterally spaced and apertured tabs 130 which are disposed substantially centrally of the longitudinal extent of the balancer member 124. As best illustrated in Fig. 9, the tabs 130 straddle the apertured portion 132 of the movable contact member 86, being connected thereto as by the pivot 134. The balancer member 124 also constitutes a latch and, in this connection, is provided with a latching aperture 136, adjacent one end thereof, for releasable engagement by the latching tip 138 provided on the actuator 90. In order to bias the latch 124 for engagement with the actuator 90, provision is made for a compression spring 140 which is disposed about a lateral projection 142 of the holder 126, which projection constitutes a guide for the spring 140, the latter being seated within a recess 144 defined in the movable switch member 86.

The circuit breaker mechanism is provided with a thermostatic control element which, as here shown, is constituted by a flexible bimetallic strip 146. Said strip is secured at one end thereof to a depending portion 148 of the movable switch member 86, said portion being preferably riveted over to effect said securement. It will be noted that the bimetallic strip 146 underlies the balancer member or latch 124. A calibrating screw 150, which is threaded into an aperture 152 (Fig. 16) defined in the balancer member 124, extends through the control element 146 the latter being provided with an aperture 154 (Fig. 4) the diameter of which is substantially greater than the diameter of the shank of screw 150 so that there is no direct mechanical engagement or electrical contact between the screw 150 and the control element 146. An insulated bushing or washer 156 is interposed between the head of the screw 150 and the bimetallic control element 146 and, therefore, it will be apparent that the free end of the control element is electrically insulated from the balancer member 124. The previously identified flexible connector 82 interconnects the control element 146 and the terminal member 78. Consequently, in the closed condition of the circuit breaker, the circuit therethrough is completed as follows: from the terminal member 70 through the engaged contacts 72 and 88 to the movable switch member 86, through the latter to the bimetallic element 146, through said element to the flexible connector 82 and through the latter to the terminal member 78. Since the insulated bushing 156 prevents the flow of current between the latch member 124 and the control element 146, or between the actuator and the control element, it will be readily apparent that no portion of the current is bypassed through the movable switch member to either the balancer member 124 or the actuator 90, and, in this connection, it will be therefore noted that any necessity for insulation between the actuator and the movable switch member is obviated.

In addition to providing an operative connection between the bimetal 146 and the balancer member 124, the screw 150 also serves as a calibration device for the circuit breaker. In this connection, it will be understood that when the circuit breaker mechanism is originally inserted within its housing, the previously identified closure 41 for the housing is omitted therefrom and the bolts 40 are not tightened down so that the casing parts 36 and 38 are loosely held together. A suitable tool or instrument, which is illustrated in phantom at 158 in Fig. 5, may then be inserted through the opening 43 in the housing, which opening is available therein with the closure 41 removed therefrom, to engage the head of the calibration screw 150. It will be apparent that when the screw is rotated in a direction to further thread the latter into the latch 124, the extent of the engagement of the latching tip 138 of the actuator in the latch aperture 136 is decreased. Consequently, the degree or amount of deflection of the control element 146, which is required to effect the disengagement of the latch member 124 from the latching tip 138, is decreased whereby to decrease the magnitude of the current which is required to effect the tripping of the circuit breaker. Consequently, the current rating of the breaker is decreased. Conversely, as the screw 150 is rotated in a direction to withdraw the latter from the latch 124, it will be apparent that the current magnitude required to trip the breaker is increased whereby to increase the current rating of the circuit breaker. After the circuit breaker is calibrated as required, the closure 41 may be inserted in the opening 43 provided therefor in the casing and the bolts 40 tightened down.

Pursuant to a feature of the present invention, provision is made to retain the calibration screw 150 in any adjusted position thereof for retaining the calibrated condition established thereby. In this connection, it will be noted that the holder 126 is provided with an extending portion 160 which partially overlies the aperture 152 provided in the balancer 124, as best illustrated in Figs. 9 and 16. Consequently, it will be understood that the threads, in the portion of the shank of screw 150 which projects from the aperture 152, are engaged by the marginal edge of the portion 160 the springiness of which thus serves to retain the calibration screw 150 in adjusted position thereof.

Provision is made to compensate or to neutralize for mechanical shock and vibration so as to prevent the operation of the circuit breaker mechanism when subjected to such shock or vibration. In this connection, the latch member 124, which, when disengaged from the actuator 90 effects the tripping of the circuit breaker, is arranged to balance out the mechanical shocks and vibrations. More specifically, the balancer member 124 is so arranged that its mass at one side of its pivot 134 is substantially equal to its mass at the other side of the pivot. In this connection, it will be noted that at the right hand side of the pivot 134, viewing Figs. 4 and 5, the balancer member 124 is provided with the portion 162. Said portion 162 tends to make the mass at the right side of the pivot equal the mass at the left of the pivot 134, to which latter mass there is added a portion of the bimetal 146, a portion of the flexbile conductor 82, the calibration screw 150 and the washer 156 all of which are to the left of the pivot 134. It will be understood that this balanced condition of the balancer member 124 is determined empirically. Consequently, when the balancer member is subjected to shock or vibration at one side of its pivot, said shock or vibration will be balanced out by the inertia of the balancing member on the opposite side of its pivot. For example, viewing Figs. 4 and 5, shock at the left of the pivot 134, which in the open condition of the breaker would tend to close the latter, and which in the closed condition of the breaker would tend to open the latter, is balanced out by the inertia of member 124 at the right of the pivot. Similarly, shock at the right of the pivot 134, which in the closed condition of the breaker would tend to open the latter, is balanced out of the inertia of member 124 at the left of the pivot. Consequently, it will be readily apparent that the circuit breaker of the present invention has provision to neutralize or compensate for mechanical shocks and vibrations.

Provision is made to prevent the sticking or fusing of the circuit breaker contacts which may result from the hesitant closing of the circuit breaker by an operator. As is well known to those skilled in the art, hesitant or timid operation of the manual operating member or handle of the circuit breaker immediately before the engagement of the contacts thereof, may permit the current to arc across the gap between the contacts and result in the generation of relatively high heat at the contacts which may serve to weld or fuse the latter together upon engagement thereof. Such welding or fusing of the contacts will result in the sticking thereof to prevent the automatic opening of the circuit breaker upon overload or under other abnormal circuit conditions. Handle 32 is connected by a drive mechanism including elements 96, 196, 90, 124 and 86 to the movable contact 88, normally tending to drive the movable contact 88 progressively toward companion contact 72 as the handle is progressively moved from the "off" extreme position (Fig. 6) in which the contacts are open toward the opposite "on" extreme (Fig. 5) in which the contacts are closed. Springs 196, interposed in this linkage, provide contact pressure and compensate for wear and other variables, as in Christensen Patent No. 2,662,950 issued December 15, 1953. Regarded otherwise, these springs allow operation of the handle in the direction to complete its "on" stroke even though the drive linkage operated by the handle is proportioned to assure engagement of the contacts before the handle has completed its "on" stroke. Overtravel of the handle beyond this point builds contact pressure. This mechanism could be operated gradually, back and forth, to close and open the contacts in what is called a contact "teasing" motion, except for the following novel feature.

Pursuant to this feature of the invention, provision is made for an "anti-tease" lever 164, best illustrated in Fig. 17, which is pivotally mounted on a projection 166 (Fig. 7) provided in the casing. The lever 164 is provided with a free end portion 168 which projects into the path of movement of the handle body 58 when the handle is moved from the position thereof illustrated in Fig. 4 to the position thereof illustrated in Fig. 5. In this connection, it will be noted that the handle body is provided with the recessed portion 170 (Fig. 13) to effect such engagement with the lever 164. In addition, the anti-tease lever is provided with a shank 172, the free end of which is formed into a hook 174. Above the hook the shank is provided with the longitudinally extending marginal edge portions 176 and 178 which are offset widthwise of the shank 172 and which are interconnected by the diagonally extending marginal edge portion 180. A tension spring 182 is interconnected between the actuator 90 and the hook 174, as best illustrated in Figs. 4 and 5, and serves to bias the latching tip 138 into engagement with the latching aperture 136. The lever 164 also serves as a guide for the compression spring 184 which operates to effect the disengagement of the contacts upon tripping of the circuit breaker. It will be noted that the spring 184 is mounted on the shank 172 and seats on a bracket 186 which is seated in the recessed marginal edge portion 188 of the movable contact member 86, being secured to a side thereof, as at the aperture 190 provided therein. As best illustrated in Fig. 7, the bracket 186 is provided with an open recessed portion 192 through which the shank 172 of the anti-sticking lever 164 extends.

In the open condition of the circuit breaker, the marginal edge portion 178 of the lever 164 abuts the bounding surface or edge 194 (Fig. 7) of the recess 192. As the handle is then pivoted from the position thereof illustrated in Fig. 4, to the position thereof illustrated in Fig. 5, to close the circuit breaker, it will be apparent that the resultant pivotal movement of the movable contact member 86 in a direction to close the circuit breaker, which is effected by the handle through the medium of the link assembly 96 and the actuator 90, causes the recess surface 194 to ride up the lever edge portion 178. At about the time that the recess surface 194 has completed its movement up the lever edge 178, the handle portion 170 engages the projection 168 of lever 164 which, as previously indicated, is disposed in the path of movement of said handle portion and causes pivotal movement of the lever 164 in a counter clockwise direction viewing Fig. 4 and stresses the spring 182. Continued rotation of the handle in the same direction, causes the inclined marginal edge portion 180 of the lever to ride along the edge 194 of the recess 192. During this entire operation, it will be understood that the operator is applying pressure on the handle 32 to pivot the latter from the position thereof illustrated in Fig. 4 to that illustrated in Fig. 5, which pressure is exerted on the movable contact member 86, through link 96 and actuator 90, to pivot the movable contact member in a direction to close or engage the contacts. However, said closing movement of the movable contact member is opposed by the engagement of the recess edge 194 by the diagonal portion of the anti-tease lever which is biased thereagainst by the spring 182. When the inclined portion 180 rides past the recess edge 194, the opposing or counter force exerted by the diagonal portion 180 under the bias of spring 182 is suddenly relieved, the spring 182 holding the edge portion 176 of the lever against the recess edge 194 and the handle extension 170 rides swiftly down the lever extension 168 to the position thereof illustrated in Fig. 5. During the described operation of the handle 32, to close the breaker, the springs 196 connected to the pivot pin 106 and seated on guide portions 198 in the lever elements 98 are compressed despite the fact that the lever 164 prevents the closing of the contacts. At the point that the opposition of the lever 164 is removed, as described, the springs 196 have been sufficiently compressed to complete the closing of the contacts with a snap action regardless of the fact that the handle may be held in position at said point in its movement from its off to its on position. In this connection, it will be understood that the link 96 and the actuator 90 constitute a toggle and that the springs 196 operate upon said toggle to provide a spring snap action therefor. This, in effect, provides a spring toggle type of action during the last portion of the closing movement of the handle 32 so that the handle, and, consequently the movable contact member 86, complete their closing movements with a snap action. This sharp, even and positive action at the end of the closing movement of the handle and the movable contact member deprives the operator of control of the speed of movement of the movable contact member during said portion of the closing movement. This, therefore, prevents the so-called "teasing" of the handle by the operator at the end of the handle movement so as to prevent arcing across the contacts sufficient to heat the latter to a point where they may fuse upon engagement thereof. Consequently, the contacts will not stick to prevent the automatic tripping of the circuit breaker.

As previously indicated, there is a lost motion connection between the actuator 90 and the lever assembly 96, which is constituted by the engagement of the pivot 106, carried by the actuator in the slots 102 of the lever. In order to provide for resilient contact pressure in the closed condition of the circuit breaker to compensate for wear of the contacts or for manufacturing inaccuracies, provision is made for the previously mentioned spring members 196. As best illustrated in Fig. 8, the springs 196 at one end thereof are each connected to the pivot pin 106 and seat on the spring guide portions 198 provided on each of the lever elements 98. It will be noted that in the closed condition of the circuit breaker, as illustrated in Fig. 5, the springs 196 are compressed and operate through the lost motion connection between the link assembly 96 and the actuator 90 to bias the movable switch member 86 in a counter clockwise direction, viewing said figure, so as to resiliently press the movable contact 88 against the stationary contact 72. The link 96, being more rigid than the springs 196, operates to move the actuator positively in one direction toward re-set position following the automatic opening of the circuit breaker. This combination of the resilient means and the link in the operative connection between the handle 32 and the actuator is fully described and claimed in the application of Paul M. Christensen, Serial No. 234,297 filed June 29, 1951, and assigned to the assignee hereof, now United States Patent No. 2,662,950, dated December 15, 1953.

The circuit breaker of the present invention is of the trip-free type so that even if the handle thereof is retained in the closed condition thereof the circuit breaker will still trip upon the occurrence of an overload or other abnormal current condition. In this connection, Fig. 6 indicates the condition where the handle 32 is held in the circuit making condition thereof, as in Fig. 5, and automatic tripping of the circuit breaker occurs. Referring now to Fig. 6, it will be noted that upon the occurrence of an overload or other abnormal current condition, the control element 146 flexes from the full line to the broken line position thereof and acting through the screw 150 moves to the balancer or latch member 124 in the same direction about the pivot 134 to disengage or unlatch the actuator 90. This permits the compressed spring 184 to expand and rotate the movable switch member 86 in a clockwise direction, viewing said figure, to disengage the contacts. The actuator 90 and the link 96 assume the position thereof illustrated in Fig. 6.

Upon normal tripping action of the circuit breaker, that is, where the handle 32 is not physically retained in the circuit making condition thereof, in addition to the bimetallic control element 146 flexing in a direction to disengage the latch 124 from the actuator 90 and the expansion of the spring 184 to move the movable contact member 86 to separate the contacts, the expansion of the spring 184 also causes the lever 164 to be pivoted from the position thereof illustrated in Fig. 5 to the position thereof illustrated in Fig. 4, and said pivotal movement of the lever returns the handle to an intermediate position thereof, which is illustrated in broken line in Fig. 4. It will be noted in this connection that since the opening spring 184 for the circuit breaker is not directly connected to the handle, the latter is not returned to the full manual off position thereof, as illustrated in full line in Fig. 4, but to said intermediate position so as to give a clear indication of the fact that the circuit breaker has been automatically tripped. Consequently this permits the ready use of the circuit breaker not only as a manual switching device which will have a handle-make position, as in Fig. 5, and a handle-break position, as in full line in Fig. 4, but will also have an intermediate handle position to indicate the automatically tripped position. From said intermediate position, the circuit breaker is reset by moving the handle first to the full off position to reset the actuator 90, and then to the on position illustrated in Fig. 5 to close the breaker.

The use of the latch member 124 facilitates the relatching of the circuit breaker after the automatic opening thereof. In a circuit breaker where the bimetallic control element such as member 146 functions as a latch, it may become necessary for the actuator to push the bimetal back, after the latter cools, in order to relatch the circuit breaker mechanism for closing the breaker. Since the actuator 90, which may otherwise be called the latched member, is latched to the latch member 124 and not to the bimetal 146, said relatching is facilitated.

Where it is desired to provide the circuit breaker with a magnetic tripping action, in addition to the thermal tripping action of the bimetallic control element 146, for example, as described in Patent No. 2,647,186, dated July 28, 1953, to T. M. Cole, and in Patent No. Re. 23,188, dated January 10, 1950, to H. A. Humpage, both of which are assigned to the assignee of the subject application, the balancing member 124 may be constructed of ferrous metal at the left of its pivot 134 viewing Figs. 4 and 5, or a separate piece of ferrous metal may be added to the balancing member at the left of said pivot. Said ferrous metal would constitute a magnetic armature pivoted at 134 and would be attracted to the bimetallic control element 146 which would serve as an electromagnetic member, to trip the breaker. This will result in a magnetic tripping action as fully described in said patents.

In circuit breakers of the present type, which utilize a thermally responsive control device, such as the flexible bimetallic strip 146, to open the breaker when the current therethrough reaches a predetermined magnitude, which in turn, generated a predetermined temperature sufficient to flex the control device for effecting tripping of the circuit breaker, it will be apparent that the circuit breaker will open when the ambient temperature reaches said predetermined temperature regardless of the current magnitude through the breaker. Similarly, when the ambient temperature is quite low, the current may have to reach a greater magnitude than the predetermined magnitude in order to generate the temperature required to operate the thermal control element 146. Therefore, in order to compensate for changes in ambient temperature, the spring 140 may be formed of a bimetal. With a bimetal spring 140, it will be apparent that, in the event the ambient temperature increases so as to cause the bimetal 146 to flex in a direction which would withdraw the balancer 124 from the latching tip 138 of the actuator 90, the bimetallic spring 140 will expand so as to pivot the balancer in the opposite direction to neutralize or compensate for said flexing of the strip 146, whereby to retain the pre-set relationship between the latching tip 138 and the latching member 124. Similarly, in the event that the ambient temperature is such that the bimetal will flex in the opposite direction so as to increase the engagement of the balancer and the tip 138, the bimetallic spring 140 will compress to compensate for said flexing of the bimetal. Ambient temperature compensation may also be achieved by making the balancing member 124 of bimetallic material in lieu of the spring 140. In this connection, it will be understood that the relationship between the high expanding sides of the control element 146 and the balancer member 124 will be such that the balancer member will flex in a direction opposite to the direction of flexing of the control element 146 in response to ambient temperature changes whereby to compensate for said ambient temperature changes.

In Fig. 5 it will be observed that the pivotal axis of latched member or actuator 90 and the axis of pivot 106 are in line with the thrust of compression springs 196. Consequently the operating mechanism that closes the contacts does not apply a force tending to bias latched member 90 against the latching edge of latch member 124. Without such a force, it would be of no avail to deflect the bimetal by a current overload. Bias for moving latched member 90 counterclockwise upon release by latch member 124 is provided by spring 182. After release and following initial counterclockwise motion of latched member 90, the actuating linkage including members 90 and 96 quickly collapses and allows spring 184 to drive movable contact member 86 in the opening direction about its pivot 68.

In prior mechanisms of this type, the members 90 and 96 which may be considered as a toggle were arranged to have an angle between them, so that springs provided for other purposes supplied a component for biasing the latched element (corresponding to member 90) against the latch. However this has the difficulty of introducing the possibility of widely varying latch pressures among different circuit breakers as a result of slight dimensional differences. The present construction avoids this problem, by provision of spring 182 for developing latch pressure as a separate function independent of contact-opening bias of spring 184 and independent, too, of the springs 196 that apply contact pressure. As a result, more consistent latch pressures can be obtained in production. The present circuit breakers can be designed to have light pressure with complete confidence that such pressure will be obtained irrespective of dimension variations that occur in manufacture. This in turn assists in producing breakers of low ratings.

Member 164 has been termed an anti-sticking lever. However it also serves a separate function of increasing the tension of spring 182 when the contacts close, and, conversely, of relaxing the tension in spring 182 when the contacts are open. This feature is of importance during operation of the handle assembly 32 into the off position for relatching. If spring 182 were tensioned at that time, resetting would be difficult particularly where the line of centers 92–106 is nearly in line with link 96 as shown in Fig. 4.

Figures 22, 23, 24, 25, 26:
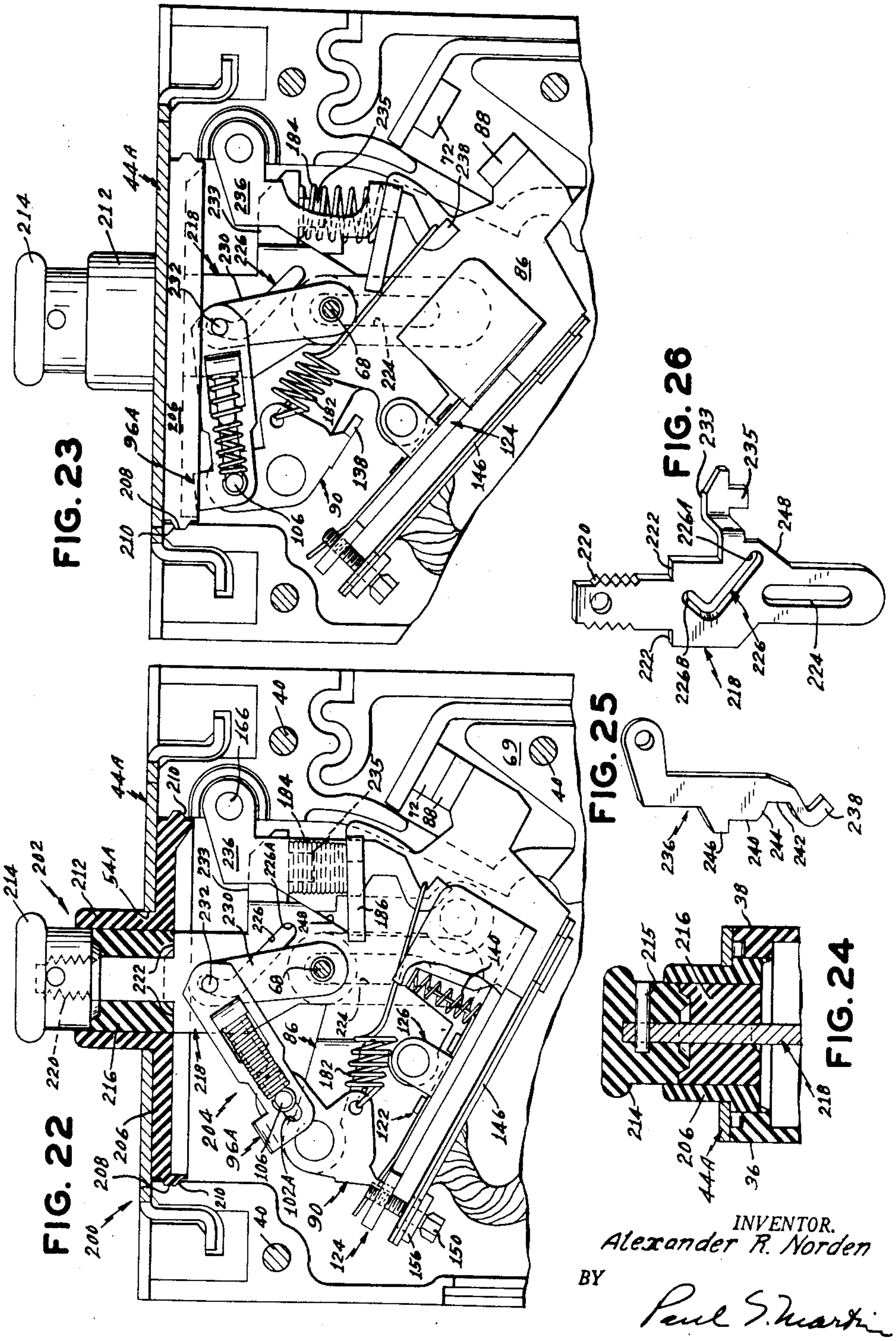
Fig. 22 is a view similar to Fig. 21, the circuit breaker being illustrated in the on or circuit making condition thereof.
Fig. 23 is a view similar to Figs. 21 and 22 and illustrates the tripped condition of the breaker, with the push-pull handle being held in the closed or circuit making condition thereof as in Fig. 22.
Fig. 24 is a sectional view taken on the line 24—24 of Fig. 20.
Fig. 25 is a perspective view of the "anti-tease" lever in the push-pull type circuit breaker which prevents the hesitant closing of the contact thereof.
Fig. 26 is a perspective view of a push-button operated slide of the push-pull circuit breaker.

Referring now to Figs. 20–29 in detail, there is illustrated the circuit breaker 200 which is provided with a handle assembly 202 adapted for push-pull or push button type of operation rather than a handle assembly which is adapted for pivoted or toggle type of operation as previously described in connection with the circuit breaker 30. It will be understood that the circuit breaker mechanism 204 of the circuit breaker 200 is contained within a housing which is similar to the housing of the circuit breaker 30, said housing being defined by companion casing parts 36 and 38 which are secured together in housing defining relation in the same manner as previously described. The mounting plate 44A of the circuit breaker 200 is substantially similar to the mounting plate 44 previously described except that the mounting plate in the present form of the invention is provided with a circular aperture 54A to accommodate the push-pull assembly 202 rather than with the square aperture 54 of the mounting plate 44. However, the mounting plate 44A is interfitted with the casing parts 36 and 38 in the same manner as previously described in connection with the mounting plate 44. In order to accommodate the push-pull handle assembly 202, the circuit breaker 200 is provided with an insert 206 (Fig. 27) formed of insulation material, which insert is provided with the tongues 208—208 which interfit in grooves 210—210 provided in the casing parts 36 and 38, as best illustrated in Figs. 21, 22 and 23. The insert 206 is provided with a cylindrical collar 212 which projects through the aperture 54A of the mounting plate 44A and constitutes a guide for the push button assembly. As here shown, the push button assembly is constituted by the push button elements 214 and 216, formed of insulation material, and which interfit, as best illustrated in Fig. 24, the element 214 constituting a finger piece for the push button assembly. Said push button assembly also includes a push button slide member 218 (Fig. 26) which is provided with a threaded shank 220, which extends from the shoulders 222 thereof. The shank extends through the push button element 216, which seats upon the shoulders 222, and threadedly engages in the finger piece 214. A pin 215 secures the slide in the finger piece. The slide member 218 is provided with an enclosed guide slot 224 which extends longitudinally thereof and with the additional enclosed slot 226, having a conformation which is best illustrated in Fig. 26.

The basic operating mechanism of the circuit breaker 200 is exactly the same as the basic operating mechanism of the circuit breaker 30. More specifically, as previously described, said common operating mechanism is constituted by a switch member assembly which comprises the movable contact member 86 provided at one end thereof with the movable contact 88 and which at the other end thereof mounts the pivoted actuator 90. Said switch member assembly also includes the balancer assembly 122 constituted by the balancer latch member 124 and the holder 126 thereof which is pivotally mounted on the movable contact member 86, as previously described. Said movable switch assembly also includes the bimetallic control element 146 carried by the movable contact member 86 and the calibration screw 150 which is provided with the insulated bushing 156 and which extends through the control element 146 for engagement with the balancer member 124. Said movable switch assembly also includes the spring 140 for biasing the latch member 124 into engagement with the actuator 90 as well as the spring 182 which provides the desired latch pressure between the actuator 90 and the balancer 124. In addition, said assembly includes also the coiled compression spring 184 which effects the opening of the contacts, as well as the spring seat or bracket 186 therefor which is provided on the movable switch member 86. Both of the circuit breakers utilize the same housing constituted by the casing parts 36 and 38 and similar mounting elements 44 and 44A in which the basic movable switch assembly is mounted.

It will be noted that the main pivot pin 68 is engaged in the slot 224 of the handle slide 218. A pair of links 230 which are connected between the pivot pin 68 and a pivot pin 232 straddle the slide 218, said pivot pin 232 being engaged in the slot 226 of the slide 218. A link assembly 96A (Fig. 28) which is substantially similar to the previously mentioned link 96 of the circuit breaker 30, straddles the links 230 being pivotally connected to the pivot pin 232 at the apertures 234 therein. The link elements 98A are each provided with an enclosed slot 102A which extends longitudinally thereof and which form a lost motion connection with the pin 106 carried by the actuator 90, as previously described. The springs 196 are tied at one end thereof to the pin 106 and seat on the projecting portions 198A of the link members 98A. Said springs serve to resiliently press the contacts 88 and 72 together in the closed condition of the circuit breaker, as previously explained.

From the foregoing, it will be understood that when the push button assembly 202 is urged into the circuit breaker casing from the circuit open position thereof illustrated in Fig. 21 to the circuit making position thereof illustrated in Fig. 22, the slide 218 will be moved into the casing from the position thereof illustrated in Fig. 21 to the position thereof illustrated in Fig. 22. The main pivot pin 68 being engaged in the slot 224, and fixed in the casing serves to guide the slide during said movement thereof and it will be apparent that the pivot pin 232 is moved from the slot portion 226A of the slot 226 into the angularly related portion 226B thereof. Said motion of pin 232 is transmitted through the link assembly 96A to the actuator 90 and through the latter to the movable switch member 86 for effecting the closing of the circuit breaker contacts, in substantially the same manner as in the circuit breaker 30. The actuator 90 and the link assembly 96A together constitute a toggle and it will be noted from Fig. 22 that the toggle is underset in the circuit closed condition of the circuit breaker. However, the pivot pin 232 being locked in the slot portion 226B and supported therein by the links 230, prevent the toggle from returning to the condition thereof illustrated in Fig. 21 and thereby serve to retain the circuit breaker in the closed condition thereof.

The slide 218 is provided with the laterally offset portion 233 which, with the projection 235 thereof, constitutes a seat for the upper end of the spring 184, the lower end of which abuts the spring bracket 186. Consequently, it will be apparent that the movement of the push button assembly 202 into the casing and the consequent movement of the slide 218 therein serves to compress the spring 184, as best illustrated in Fig. 22.

Upon deflection of the bimetallic control element 146, as previously explained, the actuator 90 is unlatched from the latch member 124 and the expansion of the spring 184 serves to disengage the contacts and open the circuit breaker. It will be noted that said expansion of the spring 184 serves to move the slide 218 and, therefore, the push button assembly 202 to the circuit open position thereof, as in Fig. 21. This results in the disengagement of the pin 232 from the locking end 226B of the slot 226 and the return thereof to the slot portion 226A which permits for the expansion of the springs 196 and provides for an accelerated opening movement of the circuit breaker.

The circuit breaker 200 is also provided with an "anti-tease" lever 236 which functions in substantially the same manner as the previously described anti-tease lever 164. It will be noted that the lever 236 is pivotally mounted also on the pivot portion 166 provided in the casing and is provided with a hooked portion 238 to which is tied one end of the spring 182, the other end of which is tied to the actuator 90. In addition, the lever 236 is provided with the marginal edge portions 240 and 242 which extend longitudinally of the lever 236 and are mutually laterally offset widthwise of the lever and are interconnected by the diagonally extending marginal edge portion 244. In addition, the lever 236 is provided with the nose 246 above the marginal edge portion 240 thereof.

With the circuit breaker 200 in the circuit open condition thereof, as in Fig. 21, it will be noted that the vertically extending linear portion 242 of the lever 236 abuts the inner edge 194 of the recess 192 defined in the bracket 186 in substantially the same manner as the marginal edge portion 178 of the lever 164 in the circuit breaker 30. The spring 182 serves to bias said lever into said engagement in the recess. It will be noted that the slide 218 is provided with a diagonally extending camming surface 248 and that the lever nose 246 extends into the path of movement of said camming surface when the slide is moved in a direction to close the circuit breaker. Consequently, when the lever nose is engaged by said camming surface, the lever 236 pivots in a counter-clockwise direction, viewing Fig. 21, and as the movable switch member 86 is pivoting also in a counter-clockwise direction due to said movement of the slide 218, the recess edge 194 moves into engagement with the diagonally extending marginal edge portion 244. As in the case of the diagonal portion 180 of the lever 164, the diagonal portion 244 is biased against the recess edge 194 and opposes the closing movement of the movable switch member 86. When the inclined portion 244 rides past the recess edge 194, the opposing or counter force exerted by the diagonal portion 244 under the bias of spring 182 is suddenly relieved, the spring 182 holding the edge portion 240 of the lever against the recess edge 194.

As previously explained in connection with the pivoted handle breaker, the link 96A forms a toggle with the actuator 90, which toggle is acted upon by the tensioned springs 196 to provide a snap action when the opposition of lever 236 is relieved, said springs serving to close the breaker contacts even though the push-button assembly is held in position at the point at which said opposition is relieved. This, in effect, provides a spring toggle type of action during the last portion of the closing movement of the push-pull assembly 202 so that the movable contact member 86 completes its closing movement with a snap action in the same manner as in the circuit breaker 30 provided with the pivoted handle assembly. This movement of the lever prevents the hesitant operation of the push button assembly 202 during the last portion of its movement for closing the contacts and therefore results in the closing of said contacts with a sharp, even and positive action which deprives the operator of control of the speed of movement of the assembly 202 during said portion of the closing movement thereof.

The breaker 200 is also of the "trip-free" type. This will be apparent from Fig. 23 which illustrates the tripped condition of the breaker with the handle assembly 202 physically retained in the closed circuit position thereof upon the occurrence of an overload or other abnormal current condition, the control element 146 flexes, as illustrated in broken line in Fig. 6, and acting through the screw 150 moves the latch member 124 about its pivot 134 to unlatch the actuator 90. This permits the spring 184 to expand as illustrated in Fig. 23 to disengage the contacts, the actuator 90 and link assembly 96A assuming the position thereof illustrated in said figure.

While I have shown and described the preferred embodiments of my invention, it will be understood that various changes may be made in the idea or principles of the invention within the scope of the appended claims.

What is claimed is:

1. An automatic circuit breaker including cooperable contacts and a movable contact member bearing one of said contacts, an operating mechanism for the movable contact member to open and close the contacts, said operating mechanism including a linkage for closing and locking the contacts closed and a spring providing drive for opening the contacts when the linkage is unlocked, in combination with current responsive means for unlocking said linkage, said current-responsive means including a current-responsive latch and a member extending from one of the links of said linkage arranged to be latched by the current responsive latch when the circuit breaker is closed, said latched member having an impelling spring providing substantially all the latch pressure, and, when released by the latch, providing bias for unlocking the linkage.

2. An automatic circuit breaker in accordance with claim 1, wherein said linkage includes a toggle that is locked when the circuit breaker is closed.

3. An automatic circuit breaker in accordance with claim 1, wherein said linkage includes a toggle arranged to be on dead center when the circuit breaker is closed.

4. An automatic circuit breaker, in accordance with claim 1, wherein said operating mechanism is arranged to restore said latched member after the latter has been released, and means operated by said operating mechanism for relaxing the stress in said impelling spring when said operating mechanism is in condition to restore said latched member.

5. An automatic circuit breaker including a pair of companion contacts, a movable contact member for operating one of said contacts, operating mechanism for the movable contact member to open and close the contacts, current-responsive means including a latch controlling said mechanism effective to retain the contacts closed under normal conditions and to release said mechanism for automatic opening of the contacts in response to abnormal conditions, said mechanism including a pivoted member engageable with said latch, means applying thrust connection to said pivoted member along a line through the pivot thereof when the circuit breaker is closed, and spring means for determining the pressure of said latched member against said latch.

6. A circuit breaker including a pair of companion contacts, a movable contact member for carrying one of said contacts against and away from the other of said contacts in opening and closing the circuit breaker, current-responsive control means carried by said movable contact member, a latched member also carried by said movable contact member and latched by said current-responsive control means, spring means at all times biasing said movable contact member in the circuit-breaker-opening direction, a handle, and drive linkage connecting said handle to said latched member for driving the movable contact member to close the contacts, the foregoing being proportioned to provide substantially no pressure of said latched member against said current responsive control means, and an additional spring biasing the latched member against said current-responsive control means.

7. A circuit breaker including a pair of companion contacts, a movable contact member for carrying one of said contacts against and away from the other of said contacts in opening and closing the circuit breaker, current-responsive control means carried by said movable contact member, a latched member also carried by said movable contact member and latched by said current-responsive control means, spring means at all times biasing said movable contact member in the circuit breaker opening direction, a handle and drive linkage connecting said handle to said latched member, said drive linkage being effective when said latched member is latched for driving the movable contact member to close the contacts, the foregoing being proportioned to provide substantially no pressure of said latched member against said current responsive control means, and biasing means for said latched member including an additional biasing spring and a device engaging said additional spring and operable substantially upon closing of the contacts for causing said additional spring to bias said latched member against said current-responsive control means.

8. A circuit breaker including a pair of companion contacts, a movable contact member for carrying one of said contacts against and away from the other of said contacts in opening and closing the circuit breaker, current-responsive control means carried by said movable contact member, an actuator also carried by said movable contact member and engageable with said current-responsive control means, spring means providing contact pressure when the circuit breaker is closed, the foregoing being proportioned to provide substantially no pressure of said actuator against said current-responsive means, and additional spring means biasing said actuator against said current-responsive control means when the circuit breaker is closed.

9. A circuit breaker including a pair of companion contacts, a movable contact member for carrying one of said contacts against and away from the other of said contacts in opening and closing the circuit breakers, current-responsive control means carried by said movable contact member, an actuator also carried by said movable contact member and engageable with said current-responsive control means, an aperating handle, a spring biasing said movable contact member in the circuit-breaker-opening direction and biasing the handle away from its "on" position after release of the circuit breaker, the foregoing being proportioned to provide substantially no pressure of said actuator against said current-responsive control means and an additional spring for biasing said actuator against said current-responsive control means.

10. A circuit breaker including a pair of companion contacts, a movable contact member for carrying one of said contacts against and away from the other of said contacts in opening and closing the circuit breaker, current-responsive control means carried by said movable contact member, an actuator also carried by said movable contact member and engageable with said current-responsive control means, spring means at all times biasing said movable contact member in the circuit-breaker-opening direction, a handle and drive linkage connecting said handle to said actuator for driving the movable contact member to close the contacts and to hold the contacts closed, the foregoing being proportioned to provide substantially no pressure of said actuator against said current-responsive control means and means for biasing the actuator against said current-responsive control means, said last-named means including a spring and a device operable on said spring and operable by said handle during the circuit-breaker-closing operation thereof to cause said actuator to apply latching pressure against said current-responsive control means, said device being reversely operable by said handle to decrease said pressure and thereby facilitate reverse operation of said actuator by said linkage.

11. A circuit breaker including a pair of companion contacts, a movable contact member for carrying one of said contacts against and away from the other of said contacts in opening and closing the circuit breaker, current-responsive control means carried by said movable contact member, an actuator also carried by said movable contact member and engageable with said current-responsive control means, spring means at all times biasing said movable contact member in the circuit-breaker-opening direction, a handle and drive linkage connecting said handle to said actuator for driving the movable contact member to close the contacts and to hold the contacts closed, and means for biasing the actuator against said current-responsive control means, said last-named means including a spring and a device operable on said spring and operable by said handle during the circuit-breaker-closing operation thereof to cause said actuator to apply latching pressure against said current-responsive control means, said device being reversely operable by said handle to decrease said pressure and thereby facilitate reverse operation of said actuator by said linkage, said current-responsive control means including a current-responsive element, a latch engageable by said actuator when the circuit breaker is closed and said actuator being arranged to move along said latch upon release, said latch being mounted for operation by the current-responsive element in the tripping direction and for deflection without concurrent operation of said current-responsive element when said actuator is being reversely operated by said handle.

12. A circuit breaker including a pair of companion contacts, a movable contact member for carrying one of said contacts against and away from the other of said contacts in opening and closing the circuit breaker, current-responsive control means carried by said movable contact member, an actuator pivoted to said movable contact member and engageable with said current-responsive control means, a handle and drive linkage connecting said handle to said actuator for driving the movable contact member to close the contacts and to hold the contacts closed under control of said current responsive control means, said linkage being arranged to act on said actuator along a line through the pivotal axis thereof when the circuit breaker is closed, and a spring biasing said actuator against said current-responsive control means.

13. A circuit breaker including a pair of companion contacts, a movable contact member for carrying one of said contacts against and away from the other of said contacts in opening and closing the circuit breaker, current-responsive control means carried by said movable contact member, an actuator pivoted to said movable contact member and engageable with said current-responsive control means, a handle and drive linkage connecting said handle to said actuator for driving the movable contact member to close the contacts and to hold the contacts closed under control of said current-responsive control means, said linkage being arranged to act on said actuator along a line through the pivotal axis thereof when the circuit breaker is closed, and a spring biasing said actuator against said current responsive control means, said circuit breaker including a device coordinated with said handle to apply stress to said spring when the circuit breaker is being operated in the closing direction and to relax that stress when the circuit breaker is being operated in the reverse direction.

14. An automatic circuit breaker including a pair of companion contacts, a movable member for carrying one of said contacts against and away from the companion contact for closing and opening the circuit breaker, current-responsive means carried by said movable contact member and including a pivoted latch, a manual operating member, and operating mechanism interconnecting said manual operating member and said movable contact member for driving the contacts closed, said mechanism including an actuator pivoted to said movable contact member and arrested by latching engagement with said latch for enabling the drive mechanism to close the contacts, said actuator being arranged to move along said latch when released, spring means for opening the contacts in response to deflection of said latch, the pivoted latch being readily movable by said actuator during the return thereof to relatching position during resetting operation of said mechanism.

15. An automatic circuit breaker including a pair of companion contacts, a movable member for carrying one of said contacts against and away from the companion contact for closing and opening the circiut breaker, current-responsive means carried by said movable contact member and including a pivoted latch, a manual operating member, and operating mechanism interconnecting said manual operating member and said movable contact member for driving the contacts closed, said mechanism including an actuator pivoted to said movable contact member and arrested by latching engagement with said latch for enabling the drive mechanism to close the contacts, said actuator being arranged to move along said latch when released, spring means for opening the contacts in response to deflection of said latch, said pivoted latch being readily movable by said actuator during the return thereof to relatching position during resetting operation of operating said mechanism, said drive mechanism including means acting on said actuator along a line through the pivotal axis thereof, when said circuit breaker is closed and spring means applying bias of the actuator against the latch, said last-named means including a device coordinated with said handle to relax the bias thereof when said handle is displaced from the "on" position thereof.

References Cited in the file of this patent

UNITED STATES PATENTS

| | | |
|---|---|---|
| 1,280,115 | Klein | Sept. 24, 1918 |
| 1,952,039 | Frank et al. | Mar. 20, 1934 |
| 1,966,444 | Guett | July 17, 1934 |
| 1,975,041 | Guett | Sept. 25, 1934 |
| 2,501,363 | Toth et al. | Mar. 21, 1950 |
| 2,662,948 | Christensen | Dec. 15, 1953 |
| 2,662,950 | Christensen | Dec. 15, 1953 |
| 2,663,773 | Drobney et al. | Dec. 22, 1953 |
| 2,673,267 | Rowe et al. | Mar. 23, 1954 |
| 2,689,286 | Cole | Sept. 14, 1954 |
| 2,723,327 | Gilbert | Nov. 8, 1955 |
| 2,803,721 | Cole | Aug. 20, 1957 |